United States Patent
Bakshi et al.

(10) Patent No.: US 6,345,300 B1
(45) Date of Patent: *Feb. 5, 2002

(54) METHOD AND APPARATUS FOR DETECTING A USER-CONTROLLED PARAMETER FROM A CLIENT DEVICE BEHIND A PROXY

(75) Inventors: Bikram Singh Bakshi; Michael Man-Hak Tso, both of Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/000,762

(22) Filed: Dec. 30, 1997

Related U.S. Application Data

(60) Provisional application No. 60/041,367, filed on Mar. 25, 1997.

(51) Int. Cl.[7] .................. G06F 15/16; G06F 15/173
(52) U.S. Cl. .................. 709/229; 709/225; 709/219; 709/203; 713/201
(58) Field of Search .................. 709/229, 228, 709/225, 227, 202, 219, 217, 201, 218, 203; 340/825.34, 825.49; 713/200, 201, 153, 155

(56) References Cited

U.S. PATENT DOCUMENTS

| | | | | |
|---|---|---|---|---|
| 5,373,375 A | | 12/1994 | Weldy ........................ 358/523 |
| 5,517,612 A | | 5/1996 | Dwin et al. ................. 345/501 |
| 5,544,320 A | | 8/1996 | Konrad ....................... 709/203 |
| 5,632,015 A | * | 5/1997 | Zimowski et al. ............. 707/3 |
| 5,673,322 A | * | 9/1997 | Pepe et al. .................... 380/49 |
| 5,684,969 A | | 11/1997 | Ishida ......................... 345/342 |
| 5,696,898 A | * | 12/1997 | Baker et al. ................. 713/201 |
| 5,701,451 A | | 12/1997 | Rogers et al. .................. 707/1 |
| 5,706,434 A | | 1/1998 | Kremen et al. ............. 709/218 |
| 5,706,507 A | * | 1/1998 | Schloss ....................... 707/104 |
| 5,708,780 A | * | 1/1998 | Levergood et al. .......... 709/229 |
| 5,724,556 A | | 3/1998 | Souder et al. ......... 395/500.23 |
| 5,727,159 A | | 3/1998 | Kikinis ........................ 709/246 |
| 5,742,905 A | | 4/1998 | Pepe et al. .................. 455/461 |
| 5,768,510 A | | 6/1998 | Gish ........................... 709/203 |
| 5,774,670 A | * | 6/1998 | Montulli ..................... 709/227 |
| 5,805,735 A | | 9/1998 | Chen et al. ................. 382/239 |
| 5,805,803 A | * | 9/1998 | Birrell et al. ............... 713/201 |
| 5,812,776 A | * | 9/1998 | Gifford ....................... 709/217 |
| 5,822,539 A | * | 10/1998 | Van Hoff .................... 709/236 |
| 5,826,242 A | * | 10/1998 | Montulli ...................... 705/27 |
| 5,845,267 A | * | 12/1998 | Ronen ......................... 705/40 |

(List continued on next page.)

FOREIGN PATENT DOCUMENTS

WO    WO9719415    *    5/1997

OTHER PUBLICATIONS

Armando Fox and Eric A. Brewer, "Reducing WWW Latency and Bandwidth Requirements by Real–Time Distillation," Fifth International World Wide Web Conference, May 6–10, 1996.

Armando Fox et al., Adapting to Network and Client Variability via On–Demand Dynamic Distillation, University of Cal. at Berkeley, Sep. 1996.

*Primary Examiner*—Robert B. Harrell
*Assistant Examiner*—William C. Vaughn, Jr.
(74) *Attorney, Agent, or Firm*—Kenyon & Kenyon

(57) ABSTRACT

A method for obtaining a user-controlled parameter from a client device arranged behind a network proxy includes the steps of receiving a request originated by the client device; transmitting a responsive request to the client device, where the responsive request includes a query mechanism to elicit a user-controlled parameter from the client device; and receiving the user-controlled parameter from the client device.

8 Claims, 4 Drawing Sheets

U.S. PATENT DOCUMENTS

| | | | | |
|---|---|---|---|---|
| 5,872,850 A | * | 2/1999 | Klein et al. | 705/51 |
| 5,880,792 A | * | 3/1999 | Ward et al. | 348/722 |
| 5,918,019 A | * | 6/1999 | Valencia | 709/227 |
| 5,944,793 A | * | 8/1999 | Islam et al. | 709/220 |
| 5,958,016 A | * | 9/1999 | Chang et al. | 709/229 |
| 5,987,510 A | * | 11/1999 | Imai et al. | 709/219 |
| 5,987,611 A | * | 11/1999 | Freund | 713/201 |
| 6,006,260 A | * | 12/1999 | Barrick, Jr. et al. | 709/224 |
| 6,029,175 A | * | 2/2000 | Chow et al. | 709/219 |
| 6,029,195 A | * | 2/2000 | Herz | 709/219 |
| 6,041,355 A | * | 3/2000 | Toga | 709/227 |
| 6,047,327 A | * | 4/2000 | Tso et al. | 709/232 |
| 6,049,821 A | * | 4/2000 | Theriault et al. | 709/203 |
| 6,088,803 A | * | 7/2000 | Tso et al. | 713/201 |
| 6,101,549 A | * | 8/2000 | Baugher et al. | 709/238 |
| 6,104,716 A | * | 8/2000 | Crichton et al. | 370/401 |
| 6,155,742 A | * | 9/2000 | Franklin et al. | 709/224 |
| 6,185,625 B1 | * | 2/2001 | Tso et al. | 709/247 |

* cited by examiner

METHOD AND APPARATUS FOR DETECTING A USER-CONTROLLED PARAMETER FROM A CLIENT DEVICE BEHIND A PROXY

This application claims the benefit of U.S. Provisional Application No. 60/041,367 titled "Method for Detecting a User-Controlled Parameter from a Client Device Behind a Proxy," filed Mar. 25, 1997 by Bikram S. Bakshi et al. and assigned to Intel Corporation, the disclosure of which is expressly incorporated herein by reference.

BACKGROUND OF THE INVENTION

1. Field of the Invention

The present invention relates generally to the field of computer networking, and in particular to a method for obtaining a user-controlled parameter from a client device which communicates with other devices through a proxy.

2. Related Art

It is known to deploy a network proxy, or proxy server, as an intermediary between one or more client computers and an external network such as the Internet. Network proxies are described generally in Ian S. Graham, *HTML Source Book: A Complete Guide to HTML 3.0* (2d ed. 1996). A network proxy is commonly used in conjunction with so-called "firewall" software to protect a local area network (LAN) from unauthorized access over the Internet. Such a firewall, typically installed on a gateway computer that links a LAN to the external world, restricts externally-originated TCP/IP (Transmission Control Protocol/Internet Protocol) packets from entering the local network, thereby protecting local devices from hazards such as unauthorized access. The firewall, however, also prevents network users from directly accessing external resources such as the World-Wide Web ("the Web"). Network proxies are often used to address this shortcoming. See Graham, at 403.

Network proxies are usually configured to have free access to both internal LAN resources and external resources, and can safely pass data back and forth across the firewall. Users may then be given safe, though indirect, access to Web resources by configuring the user's Web browser to reference the firewall proxy instead of external servers (e.g., content servers). When the Web browser is used to retrieve information from the other side of the firewall, it sends a request to the firewall proxy, which then completes the request and passes the result back over the firewall to the requesting device.

One of the side-effects of using a firewall or other network proxy to control a client device's access to external network resources is that requests received by a content server, for example, although generated by a particular client device, will designate the IP address of the firewall proxy as the requesting device. In other words, the ultimate recipient of the request cannot determine the IP address of the client device that actually originated the request. This presents a problem for network applications capable of providing services customized according to user-specified preferences. A remote network proxy or content server cannot reliably use the IP address in a received request to determine such user preferences because many users may be accessing the remote device through the same proxy. Accordingly, there is a need for a method and apparatus by which a network device, such as a remote network proxy or a server, can obtain user-specific information from a client device which communicates with that network device through a firewall or other proxy.

SUMMARY OF THE INVENTION

The present invention relates generally to methods and apparatus for detecting a user-controlled parameter from a client device residing behind a proxy. Embodiments of the invention may be used, for example, to enable a network device, such as one capable of providing customized transcoding services, to acquire user-specified preferences from a client device which accesses that network device through a firewall or other proxy.

According to one particular embodiment of the present invention, a method for obtaining a user-controlled parameter from a client device arranged behind a network proxy includes the steps of receiving a request originated by the client device; transmitting a responsive request to the client device, where the responsive request includes a query mechanism to elicit a user-controlled parameter from the client device; and receiving the user-controlled parameter from the client device.

DETAILED DESCRIPTION

Embodiments of the present invention enable a network device, such as a network proxy, a transcoding server, or a content server, to obtain a user-controlled parameter from a network client which resides behind a firewall or other network proxy. Useful applications for such embodiments include communicating user-preferences with respect to scaling or otherwise transcoding network content to be downloaded to the network client.

Figure 1:
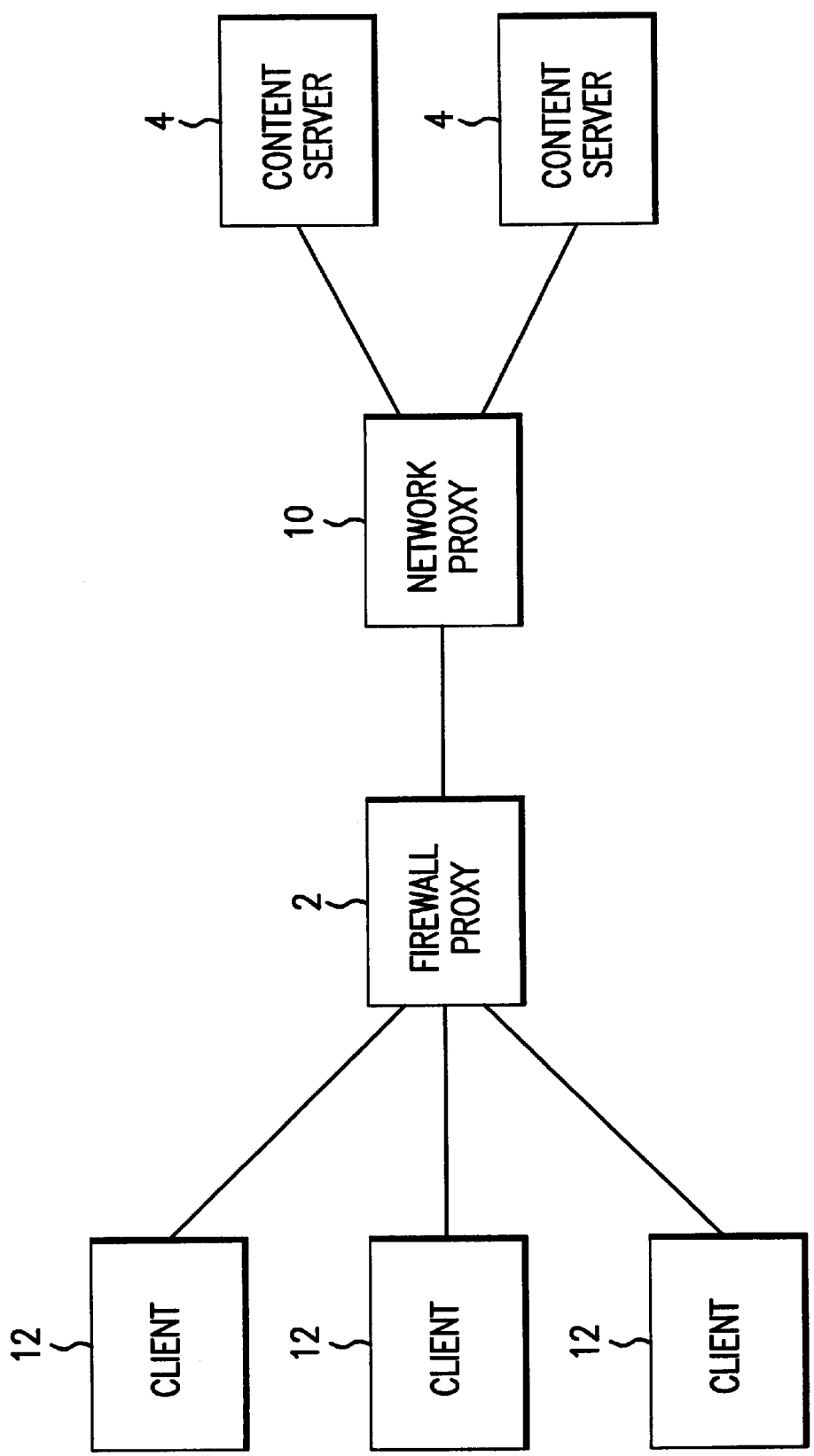
FIG. 1 is a schematic diagram illustrating an embodiment of the present invention in which client devices access network content through a network proxy.

According to a first embodiment of the present invention, illustrated in FIG. 1, a plurality of client devices 12 are configured to communicate with external network resources, such as content servers 4, through a firewall proxy 2. In this particular embodiment, a network proxy 10 is configured to intercept requests from firewall proxy 2 to content servers 4. When client device 12 generates a request for a network object, typically identified by a URL (Uniform Resource Locator), the request is transmitted to firewall proxy 2. Among other things, firewall proxy 2 typically reformats the request, replacing the IP address of network client 12 with its own IP address, and transmits the request to network proxy 10. Upon receipt, network proxy 10 determines whether it has a record of any user preferences associated with the IP address in the request. If it does not, network proxy 10 formats a reply including a query mechanism comprising, for example, a specially-configured software module or other dynamic executable module, and transmits that reply to firewall proxy 2 instead of the requested network object. Firewall proxy 2, consistent with its standard processing, then forwards this reply to network client 12.

In this particular embodiment, the query mechanism may be implemented, for example, using JavaScript, VBScript, JScript or Java code. When network client 12 receives the reply with the embedded query mechanism, the embedded code may first check whether network client 12 includes any previously-set user preferences stored in, for example, a "cookie" or similar persistent state mechanism of a type known in the art. The embedded code may optionally be configured to generate a message on network client 12 informing the user that the device is being checked for such user preferences. If no previously-set user preferences are found, the embedded code may present a dialog box or other prompt to the user requesting that the user set the preference. Once the user preference is obtained, the embedded code formats a message which includes in its body the user preference and the IP address of network client 12. The embedded code may then POST this message back to network proxy 10.

Upon receipt of the POSTed message, network proxy 10 ignores the IP address in the header of the message (corresponding to firewall proxy 2) and instead uses the IP address of network client 12 embedded in the body of the message to update, for example, a table of user preference information. Only at this point does network proxy 10 obtain the requested network object (for example, from a resident cache memory or an appropriate content server 4) and download it to firewall proxy 2. This download will be performed in accordance with the user preference obtained from network client 12. Suitable code may optionally be embedded in this second reply that will present the user of network client 12 with a pop-up window displaying the user preference with a switch for changing the preference.

Figure 2:
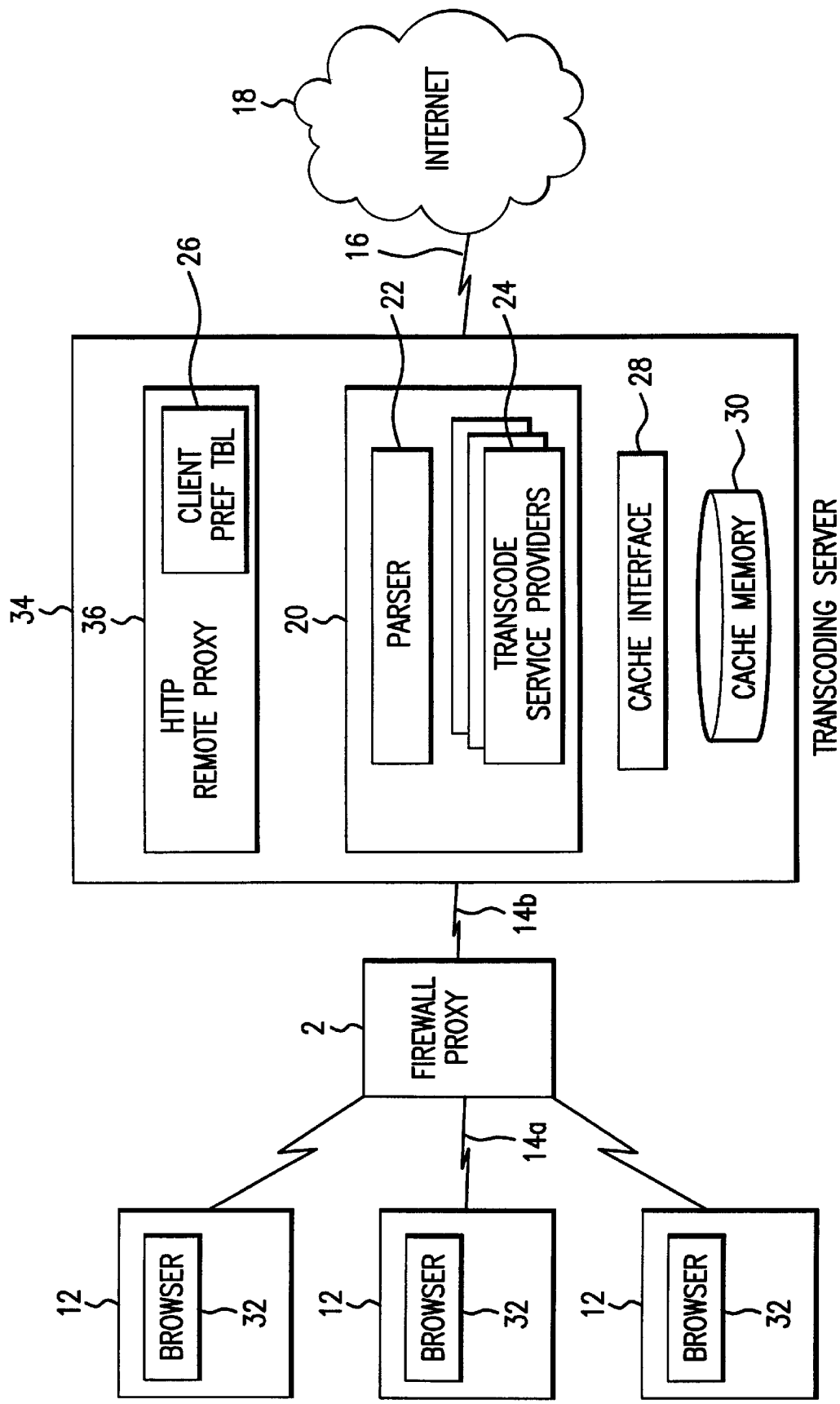
FIG. 2 is a schematic diagram illustrating an embodiment of the present invention in which client devices access network content through a transcoding server.

According to another embodiment of the present invention, illustrated schematically in FIG. 2, firewall proxy 2 is configured to communicate with external network resources through a transcoding server 34. Transcoding server 34 may be configured to provide a variety of transcoding services, such as compressing data to be downloaded to client device 12 in order to reduce user-visible latencies when client device 12 interacts with Internet 18 (e.g., browsing the Web). In this context, "transcoding" may refer to virtually any addition, deletion or modification of data.

Looking more closely at the embodiment of FIG. 2, transcoding server 34 may comprise, or be a part of, a network server, a stand-alone computer in communication with a network server, or a distributed system of computers. Transcoding server 34 may be coupled, for example, to an ISP's network, a corporate network, or anywhere on Internet 18, and may provide multiple users (i.e., clients) with a means to obtain content on Internet 18. Transcoding server 34 includes a transcoder 20 having a parser 22 and a plurality of transcode service providers 24. Parser 22 is configured to act upon data received by transcoder 20, such as a request for a network object generated by client device 12 or a reply to such a request provided by a content server device. Transcoder 20 may be implemented, for example, as a software module installed in transcoding server 34.

In the particular embodiment illustrated in FIG. 2, transcoding server 34 includes an HTTP (HyperText Transfer Protocol) remote proxy 36, capable of accessing Internet 18 over server/network communications link 16. HTTP remote proxy 36 differs from known network proxies, which generally are little more than a conduit for requests to, and replies from, external Internet resources, in that it is capable not only of examining such requests and replies, but also of acting upon commands in the requests by, for example, determining whether or not to transcode content.

As shown in FIG. 2, transcoding server 34 may also include a server-side cache memory 30 managed by a server-side cache interface 28. Server-side cache memory 30 may be used to store both original and transcoded versions of content for later transmission to network client 12 without the need to re-retrieve the content from Internet 18 or to re-transcode the content.

Parser 22 may comprise a relatively simple, uniform interface to HTTP remote proxy 36, and may provide an API (Application Programming Interface) for transcoding data received by HTTP remote proxy 36. Parser 22 may manage transcode service providers 24 through a common SPI (Service Provider Interface). In this particular embodiment, parser 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features and/or better transcoding algorithms, while at the same time not requiring changing or retesting other software components in the system.

Both parser 22 and server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by parser 22 and its associated transcode service providers 24. Thus, for data integrity and transcoding efficiency purposes, all access to server-side cache memory 30 in this embodiment is through parser 22.

In this embodiment, when network client 12 requests a hypertext object, HTTP remote proxy 36 uses either a GetObject( ) or GetScaledObject( ) call (depending, for example, on whether network client 12 is known to be capable of receiving scaled/transcoded datatypes) to retrieve the hypertext object from parser 22. If the hypertext object is not found, parser 22 uses a CreateEntry( ) call to create an entry (in effect, a placeholder) in server-side cache memory 30 for the new object. The new entry is returned to HTTP remote proxy 36, which requests the hypertext object from Internet 18. As a data stream for the hypertext object is returned, HTTP remote proxy 36 calls parser 22 using the PutObject( ) call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it, and place it within the entry of server-side cache memory 30. The current thread immediately returns to HTTP remote proxy 36, which once again calls GetScaledObject( ) (or GetObject( )). This case will always result in a cache hit. This thread then works simultaneously with the separate thread in the PutObject( ) to tunnel data (either original or transcoded) from transcoding server 34 to network client 12.

Multiple-thread processing may be used to improve the efficiency of transcoding server 34 by eliminating the need to wait for a hypertext object to be received in its entirety by HTTP remote proxy 36, or added in its entirety to server-side cache memory 30, before beginning to send the object to network client 12. Another benefit of multiple-thread processing is that parser 22 may efficiently process requests for the same hypertext object from multiple network clients 12. The hypertext object need only be retrieved from Internet 18 once, and appropriate versions may be transmitted to such multiple network clients 12 concurrently. It should be noted, however, that embodiments of the present invention may be implemented without multiple-thread processing.

As in the embodiment illustrated in FIG. 1, network client 12 may be provided with the ability to actively control aspects of the transcoding process, or indeed whether or not to transcode requested content at all. To provide this ability, HTTP remote proxy 36 may embed additional instructions at the beginning of the HTML header for the requested URL prior to transmitting the associated data stream to network client 12. As browser 32 of network client 12 receives the data stream, the embedded instructions will automatically execute so long as browser 32 is equipped to support them. For example, if the embedded instructions are implemented as JavaScript codes, browser 32 may be a JavaScript-enabled browser such as a Netscape Navigator v.2.0 or above browser, or an Internet Explorer v.3.0 or above browser. If browser 32 is not equipped for such HTML scripting, the embedded instructions will not interfere with the browser's 32 normal processing, as such browsers 32 are typically configured to ignore any data they cannot interpret.

Figure 3:
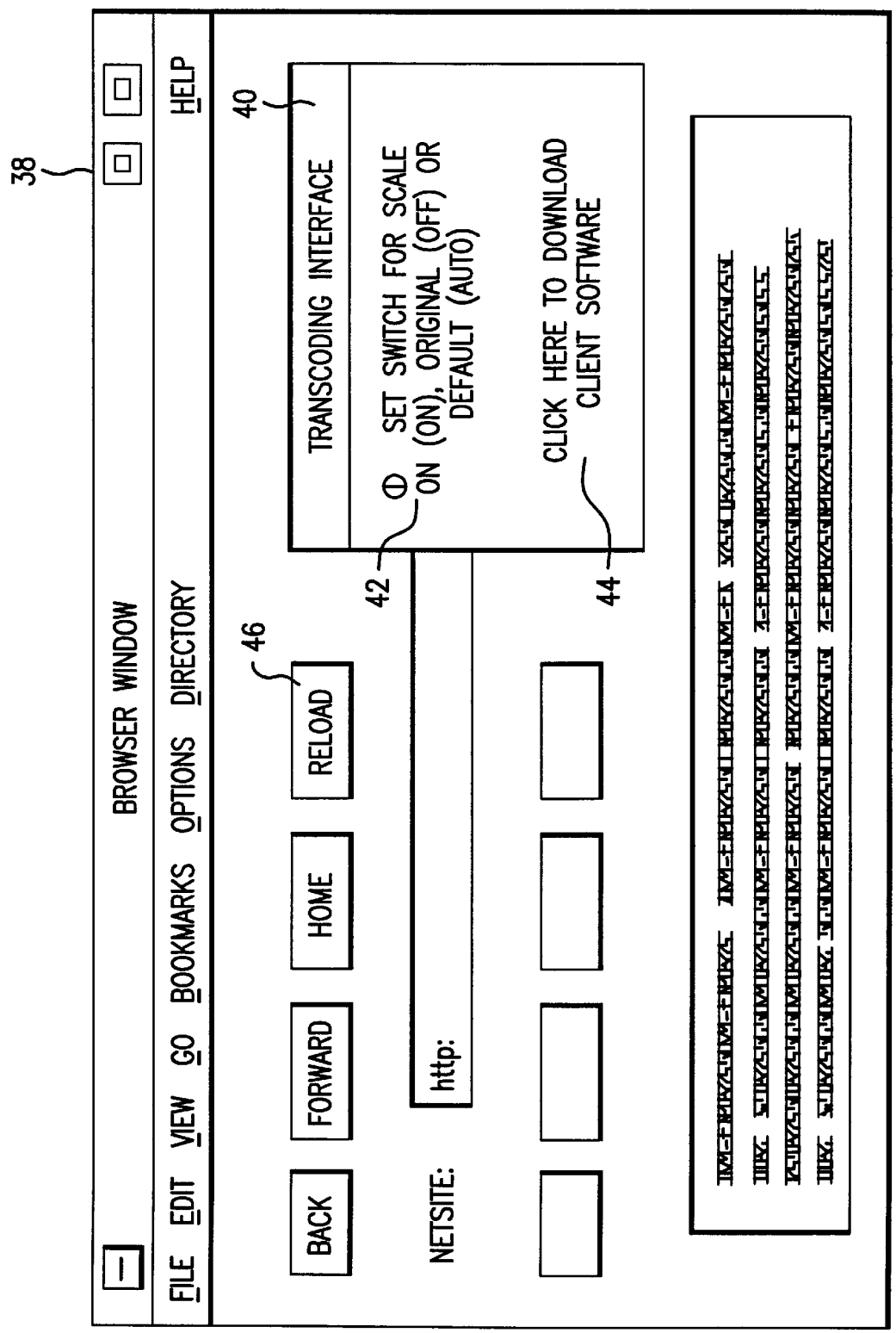
FIG. 3 is a schematic diagram illustrating an example of a user interface enabling a client device to communicate user-preference information.

The embedded instructions transmitted to network client 12 may enable the user to manipulate some of the transcoding capabilities of transcoding server 34. As illustrated in FIG. 3, the embedded instructions may drive a user interface in the form of a pop-up window 40 that is displayed at the top of a browser window 38. In this example, pop-up window 40 includes a three-state switch 42 having "ON," "OFF" and "AUTO" settings, and may also include a hypertext link 44 which the user may follow to download specialized client software supporting, for example, more sophisticated transcoding functionality. The initial setting of three-state switch 42 may be based upon a prior determination by HTTP remote proxy 36 as to whether network client 12 has an established preference for reception of transcoded content. If so, three-state switch 42 may be set to "ON;" if not, three-state switch 42 may be set to "OFF." A goal of this feature is to provide the user with some means for communicating a preference to HTTP remote proxy 36 with regard to aspects of particular transcoding features, such as a content quality/latency tradeoff where the transcoding comprises data compression/scaling. Persons skilled in the art will recognize that many other means for providing this capability are possible, and such other means could enable the user to communicate preferences beyond simply a yes/no indication for transcoding.

In the particular implementation illustrated in FIG. 3, pop-up window 40 enables the user to change his or her preference as to whether transcoded or original content is desired, and communicates such changes to HTTP remote proxy 36. Pop-up window 40 may or may not interact with browser 32, meaning the user's preference will only take effect after setting three-state switch 42 and clicking on the browser's 32 "RELOAD" button 46 to cause browser 32 to request the (transcoded or un-transcoded) content for presentation to the user. Subsequent pages in the current session may then be rendered in accordance with the new setting of three-state switch 42 without further user intervention. Upon receipt, HTTP remote proxy 36 may update user preference table 26 accordingly. As an alternative, pop-up window 40 may be configured to automatically invoke the "RELOAD" operation when the user indicates a change (such as by flipping three-state switch 42). Where browser 32 is a JavaScript-enabled browser, JavaScript instructions inserted by HTTP remote proxy 36 in the HTML document may "POST" the state of three-state switch 42 to HTTP remote proxy 36 and also cause browser 32 to "RELOAD" the current URL.

It is also possible to enable network client 12 to save the state of three-state switch 42 across multiple sessions of browser 32 using what is known in the art as a "cookie." In other words, a cookie may be used to store the state of three-state switch 42 persistently. When a new session of browser 32 is initiated by a user, this state information may be read from network client 12 and POSTed by the JavaScript code (inserted at the beginning of the HTML document) to HTTP remote proxy 36 before any content for the requested hypertext object is actually sent to network client 12. This will allow HTTP remote proxy 36 to update user preference table 26 with the correct state of three-state switch 42, and hence send correctly-transcoded content to network client 12. In such an embodiment, the state information may be POSTed to HTTP remote proxy 36 each time a given URL is requested by browser 32. This will allow network client 12 to receive the correctly-transcoded content even if the HTTP remote proxy 36 to which it is coupled changes due to, for example, a change in geographical location of network client 12 or network load-balancing procedures.

According to another embodiment of the present invention, network proxy 10 (see FIG. 1) or transcoding server 34 (see FIG. 2) may be configured to include the embedded code for obtaining user preferences within a reply including a portion of the network object requested by network client 12. This alternate embodiment may be more efficient where, for example, the network object includes both scaleable data (for example, images) and non-scaleable data (for example, HTTP text that is sent to client device 12 before the scaleable data). In such a case, network proxy 10 or transcoding server 34 may embed the code in the non-scaleable data returned to network client 12 and then await a POSTed message with user preference information before downloading the scaleable data.

Figure 4:
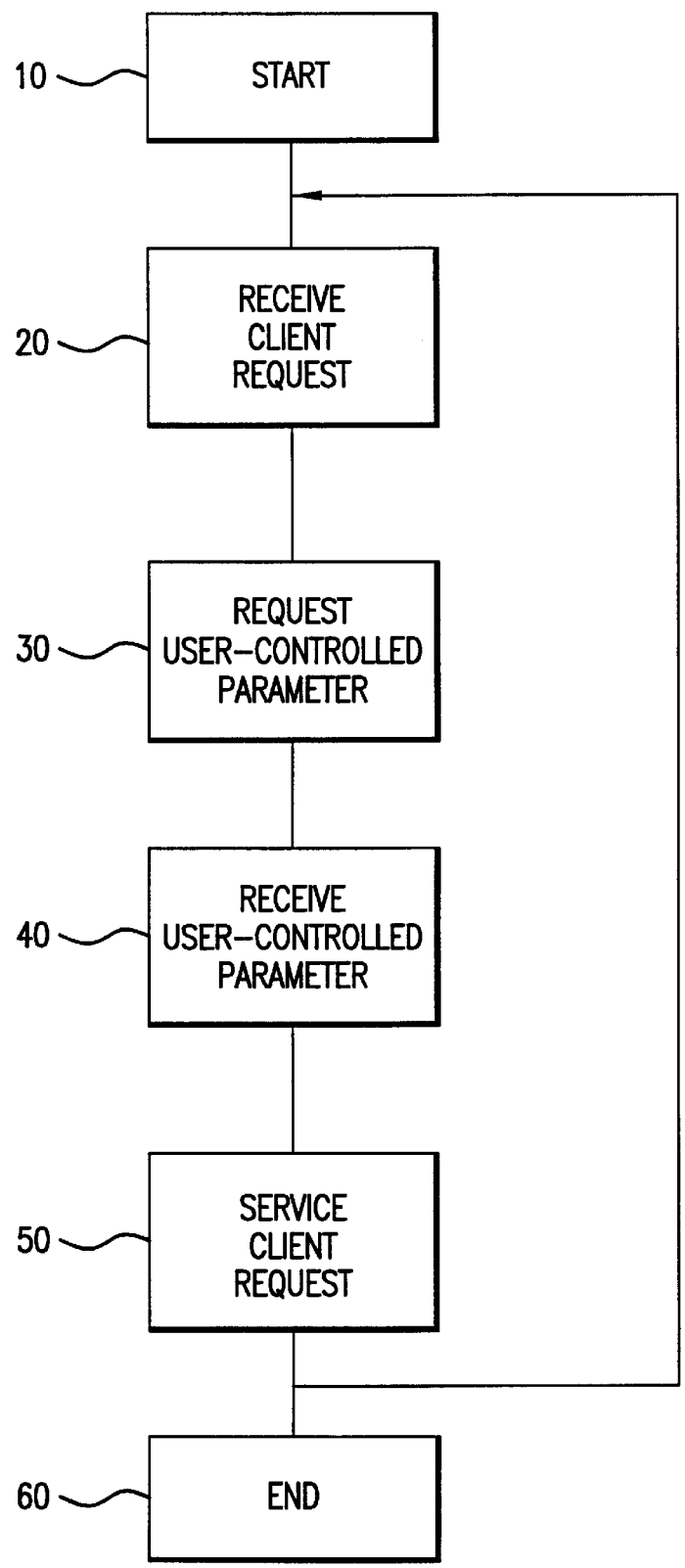
FIG. 4 is a flow diagram illustrating a method for obtaining a user-controlled parameter from a client device according to an embodiment of the present invention.

By way of further illustration, FIG. 4 is a flow chart describing a general method for obtaining a user-controlled parameter from a client device according to an embodiment of the present invention. Such a method may be performed, for example, by a network device arranged on the opposite side of a network proxy from a client device. Although such a method may be performed using the structures illustrated in FIGS. 1–3, persons skilled in the art will recognize that other structures may likewise be used. Processing begins upon receipt of a request from a client device (Step 20). A responsive request is then transmitted back to the client device including, for example, a query mechanism for eliciting a user-specified parameter from the user of the client device (Step 30). Upon receipt of the user-specified parameter (Step 40), the request originally received from the client device will be serviced in accordance with the user-specified parameter (Step 50).

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

Although the present invention has been described with reference to embodiments for accessing data from the Internet, persons skilled in the art will recognize that it is equally applicable to other networking environments. For example, embodiments of the present invention may be used to enhance data communications between a network client computer and an "intranet." An intranet typically is a secure corporate network modeled after the Internet architecture, and generally includes mechanisms for communicating with external networks such as the Internet.

The foregoing is a detailed description of particular embodiments of the present invention. The invention embraces all alternatives, modifications and variations that fall within the letter and spirit of the claims, as well as all equivalents of the claimed subject matter. For example, embodiments of the present invention may be applied to communications protocols other than HTTP. Likewise, the logic for requesting and/or acting upon user preferences for downloading data may be included in a content server, as opposed to a network proxy or a transcoding server. Other alternatives, modifications and variations are also possible.

What is claimed is:

1. A method for maintaining user-controlled download preferences for a plurality of client devices, at least one of which is arranged behind a firewall proxy configured to modify a request for a data object resident on an external network device by specifying its own network address as a requesting device address before transmitting the request to the external network device, said method comprising the steps of:

receiving at a network proxy a request originated by a client device for downloading a data object resident on an external network device, the request specifying a requesting device address, the network proxy including an HTTP remote proxy in communication with a transcoder having a parser and one or more transcode service providers, the HTTP remote proxy being configured to selectively retrieve the requested data object from the external network device or the parser using one or more HTTP calls depending upon whether the requested data object was previously retrieved and stored by the network proxy, the one or more HTTP calls comprising an HTTP Get call when the requested data object is retrieved from the parser;

searching a user preference data store for a user-controlled download preference associated with the specified requesting device address;

selectively transmitting a responsive request from the network proxy to the client device if no user-controlled download preference is found for the specified requesting device address, said responsive request including a query mechanism to elicit a user-controlled download preference from the client device and an address of the client device, the query mechanism comprising an executable module that initiates execution following its receipt by the client device;

receiving at the network proxy the elicited user-controlled download preference and address of the client device;

associating the user-controlled download preference with the address of the client device in the user preference data store; and downloading the requested data object to the client device in accordance with the user-controlled download preference.

2. The method of claim 1, wherein the user-controlled download preference comprises a preference for transcoding the requested data object prior to downloading.

3. The method of claim 1, wherein the responsive request is transmitted to the client device with a portion of the requested data object.

4. A network proxy for downloading data to a client device in accordance with a user-controlled download preference set at the client device, wherein said network proxy and said client device are on opposite sides of a firewall proxy configured to modify a request for a data object resident on an external network device by specifying its own network address as a requesting device address before transmitting the request to the external network device, said network proxy comprising a computer programmed to execute a set of instructions for:

receiving at the network proxy a request originated by a client device for downloading a data object resident on an external network device, the request specifying a requesting device address, the network proxy including an HTTP remote proxy in communication with a transcoder having a parser and one or more transcode service providers, the HTTP remote proxy being configured to selectively retrieve the requested data object from the external network device or the parser using one or more HTTP calls depending upon whether the requested data object was previously retrieved and stored by the network proxy, the one or more HTTP calls comprising an HTTP Get call when the requested data object is retrieved from the parser;

searching a user preference data store for a user-controlled download preference associated with the specified requesting device address;

selectively transmitting a responsive request from the network proxy to the client device if no user-controlled download preference is found for the specified requesting device address, said responsive request including a query mechanism to elicit a user-controlled download preference from the client device and an address of the client device, the query mechanism comprising an executable module that initiates execution following its receipt by the client device;

receiving at the network proxy the elicited user-controlled download preference and address of the client device;

associating the user-controlled download preference with the address of the client device in the user preference data store; and downloading the requested data object to the client device in accordance with the user-controlled download preference.

5. The network proxy of claim 4, wherein the client device and the network proxy interact according to a predetermined communications protocol, the responsive request comprising executable code embedded in a message compliant with the predetermined communications protocol.

6. A storage medium containing a set of instructions for execution by a network proxy that communicates with a client device through a firewall proxy configured to modify a request for a data object resident on an external network device by specifying its own network address as a requesting device address before transmitting the request to the external network device, the network proxy being arranged on an opposite side of the firewall proxy from the client device, said set of instructions including instructions for:

receiving at the network proxy a request originated by a client device for downloading a data object resident on an external network device, the request specifying a requesting device address, the network proxy including an HTTP remote proxy in communication with a transcoder having a parser and one or more transcode service providers, the HTTP remote proxy being configured to selectively retrieve the requested data object from the external network device or the parser using one or more HTTP calls depending upon whether the requested data object was previously retrieved and stored by the network proxy, the one or more HTTP calls comprising an HTTP Get call when the requested data object is retrieved from the parser;

searching a user preference data store for a user-controlled download preference associated with the specified requesting device address;

selectively transmitting a responsive request from the network proxy to the client device if no user-controlled download preference is found for the specified requesting device address, said responsive request including a query mechanism to elicit a user-controlled download preference from the client device and an address of the client device, the query mechanism comprising an executable module that initiates execution following its receipt by the client device;

receiving at the network proxy the elicited user-controlled download preference and address of the client device;

associating the user-controlled download preference with the address of the client device in the user preference data store; and downloading the requested data object to the client device in accordance with the user-controlled download preference.

7. The storage medium of claim 6, wherein said storage medium comprises a magnetic storage device.

8. The storage medium of claim 6, wherein said storage medium comprises a memory of said computer.

* * * * *